(12) United States Patent
Binder et al.

(10) Patent No.: US 11,598,417 B2
(45) Date of Patent: Mar. 7, 2023

(54) DEVICE FOR THE SEALED PASSING-THROUGH OF AN ELONGATE PART

(71) Applicant: Pflitsch GmbH & Co. KG, Huckeswagen (DE)

(72) Inventors: Karlheinz Binder, Huckeswagen (DE); Martin Lechner, Lindlar (DE)

(73) Assignee: Pflitsch GmbH & Co. KG, Huckeswagen (DE)

( * ) Notice: Subject to any disclaimer, the term of this patent is extended or adjusted under 35 U.S.C. 154(b) by 841 days.

(21) Appl. No.: 16/257,730

(22) Filed: Jan. 25, 2019

(65) Prior Publication Data
US 2019/0170253 A1 Jun. 6, 2019

Related U.S. Application Data

(63) Continuation of application No. PCT/DE2017/100570, filed on Jul. 10, 2017.

(30) Foreign Application Priority Data

Jul. 25, 2016 (DE) .................... 10 2016 113 655.7

(51) Int. Cl.
*F16L 5/06* (2006.01)
*F16J 15/02* (2006.01)
(Continued)

(52) U.S. Cl.
CPC ............ *F16J 15/028* (2013.01); *F16L 5/06* (2013.01); *F16L 19/061* (2013.01);
(Continued)

(58) Field of Classification Search
CPC .......... F16J 15/028; F16L 19/061; F16L 5/06; H02G 3/0675; H02G 3/0641; H01R 13/582
See application file for complete search history.

(56) References Cited

U.S. PATENT DOCUMENTS

| 3,215,457 A | 11/1965 | Teeters |
| 2015/0048614 A1* | 2/2015 | Coyle, Jr. ............... F16L 19/12 285/322 |

FOREIGN PATENT DOCUMENTS

| CA | 2831583 A1 * | 5/2014 | ............... F16L 5/06 |
| DE | 2547914 | 5/1977 | |

(Continued)

OTHER PUBLICATIONS

International Search Report for International Application PCT/DE2017/100570, dated Oct. 16, 2017.
(Continued)

*Primary Examiner* — Zachary T Dragicevich
*Assistant Examiner* — James A Linford
(74) *Attorney, Agent, or Firm* — Burris Law, PLLC

(57) ABSTRACT

A device for the sealed closing of an opening for one or more elongate parts to pass through includes a sealing and/or clamping element with at least two interacting first and second parts that are axially displaceable relative to one another, and a pressure contour acting axially onto the sealing and/or clamping element. A first axial displacement of the pressure contour and an axial displacement of the at least one second part relative to the at least one first part causes a first change in geometry of the at least one first part transversely to the displacement direction. Also, a further axial displacement of the pressure contour causes a further change in geometry of the at least one first part transversely to the displacement direction such that the opening is sealed around the one or more elongate parts passing therethrough.

20 Claims, 10 Drawing Sheets

(51) Int. Cl.
    *F16L 19/06*     (2006.01)
    *H01R 13/52*     (2006.01)
    *H01R 13/58*     (2006.01)
    *H02G 3/06*     (2006.01)

(52) U.S. Cl.
    CPC ....... *H01R 13/5202* (2013.01); *H01R 13/582* (2013.01); *H02G 3/06* (2013.01); *H02G 3/0641* (2013.01); *H02G 3/0675* (2013.01)

(56) References Cited

FOREIGN PATENT DOCUMENTS

| | | | |
|---|---|---|---|
| DE | 4127162 C1 * | 11/1992 | ................ F16L 5/06 |
| DE | 29701321 U1 * | 5/1998 | ................ F16L 5/06 |
| DE | 102009022702 A1 * | 12/2010 | ............ F16L 13/103 |
| DE | 202011109094 U1 * | 1/2012 | ............ H02G 3/0675 |
| DE | 102012106592 A1 * | 1/2014 | ............ H02G 15/007 |
| DE | 102013218732 A1 * | 3/2015 | ............ H02G 3/0675 |
| EP | 0203263 | 12/1986 | |
| EP | 2735779 | 5/2014 | |
| WO | WO-9427079 A1 * | 11/1994 | .......... F16L 19/0656 |

OTHER PUBLICATIONS

International Preliminary Report on Patentability for International application PCT/DE2017/100570, originally dated Jan. 29, 2019.

* cited by examiner

DEVICE FOR THE SEALED PASSING-THROUGH OF AN ELONGATE PART

CROSS-REFERENCE TO RELATED APPLICATIONS

This application is a continuation of International Application No. PCT/DE2017/100570, filed on Jul. 10, 2017, which claims priority to and the benefit of DE 10 2016 113 655.7 filed on Jul. 25, 2016. The disclosures of the above applications are incorporated herein by reference.

FIELD

The present disclosure relates to a device for the sealed closing of an opening, as for example a wall opening or for example a ring opening, between a passage opening through a wall or an insertion opening in a wall, in particular of one or more elongate part/s being passed through this opening or into this opening, as well as of a sealing and/or clamping element inserted into the opening.

BACKGROUND

The statements in this section merely provide background information related to the present disclosure and may not constitute prior art.

Devices for the sealed closing of an opening are well-known in the prior art. They are for example used for passing conduits through casing walls of electric devices, in order to facilitate a sealed, stress relieved passing through of the cables.

EP 2 735 779 B1 for example discloses a device where a lamella cage is inserted into a stud and in which a sealing insert is retained. The lamellae and the sealing insert at their end faces touch the end piece of a cap nut which comprises a dome-shaped or conically-shaped inner wall, through which the lamellae and the sealing are displaced radially inside, when the cap nut is screwed onto the stud, and in the nominal assembly position clamp and seal an elongate part being passed through the device. The sealing abuts the elongate part in a way that a sealing is realized.

The known solutions are disadvantageous in that the devices only have a relatively small variable clamping area and can thus only retain elongate parts having small diameter differences. For greater or smaller clamping areas alternative devices have to be provided.

SUMMARY

In one form of the present disclosure a cost-effective device which is applicable for the sealed passing through or in of elongate parts with many different diameters through or into an opening or for the sealed closing of openings with different diameters, wherein at the same time, a simple assembly and preassembly is provided. Moreover, the product range can be enlarged, which means that alternative and constructive solutions can be provided.

The present disclosure provides that the sealing and/or clamping element consisting of at least two interacting first and second parts which are axially displaceable relative to one another, and of a pressure contour acting axially onto the multi-part sealing and/or clamping element, and wherein, via a first axial displacement of the pressure contour, an axial displacement of at least one second part of the at least two interacting parts of the sealing and/or clamping element relative to the at least one first part of the sealing and/or clamping element, causes a first change in geometry of essentially only the at least one first part, for example a radial change in diameter, transversely to the displacement direction. Also, a further axial displacement of the pressure contour causes a further change in geometry of the sealing and/or clamping element consisting of the at least one first and at least one second interacting parts, for example a radial change in diameter, is realized, transversely to the displacement direction.

The axial displacement of the parts relative to one another causes a radial change in diameter, wherein the degree of the change in diameter depends on the degree of the displacement, in a way that the change in diameter increases with increasing radial displacement. In this way, variable diameters can be sealed and clamped with one device.

In some aspects of the present disclosure, it is provided that for the sealed passing through or in elongate parts, a cylindrical reception at a wall or in a wall, or at a stud being attachable to a wall or formed in one piece with it, into which the sealing and/or clamping element having a through hole is inserted, as well as a holed pressure screw, cap nut or pressure part with a pressure contour or as a pressure contour, which can be put into, put onto or screwed into or onto the opening region of the cylindrical reception, is arranged, which acts upon the sealing and/or clamping element. The sealing and/or clamping element consists at least two tube-like parts and the first part or second part can be connected with a first end region to a delimiting contour of the cylindrical reception as an axial path limitation. Also, the second part can be plugged onto the first part in an at least a partly axially displaceable way and a second end region of the first part and/or of the second part can be radially deformed through a thickening of the second part and/or the first part, respectively, when the second part is at least partly or completely slid onto the first part. In some aspects of the present disclosure, the pressure screw, the cap nut or the pressure part comprise a pressure contour and when the second part or the first part are axially displaceable relative to the first part or the second part, respectively, at least the first tube-like part and/or the second tube-like part is radially deformed by the pressure contour when in a nominal assembly position (i.e., an assembled position).

In an initial position, one of the two parts is at the end face of its first end region attached to the delimiting contour of the cylindrical reception, for example plugged on or pressed on, and retained in a non-displaceable manner in the axial direction. The delimiting contour can be arranged inside or outside the cylindrical reception. Also, the second part in the initial position is plugged in an axially displaceable manner onto the first part, for example overlapping half of it. However, the pressure screw, the cap nut or the pressure part do not act upon the device in the initial position such that the tube-like parts remain undeformed and together have an essentially cylindrical through hole which is flush with the cylindrical reception or formed coaxially towards it. In this way, the through hole forms with the cylindrical reception a channel through which a cable or a similar part can be pushed through in a simple manner.

From this initial position, the device via a first step is put into a first assembly position, in which a first deformation of the sealing- and/or clamping element is generated. For this purpose, a pressure is exerted axially onto one of the parts, for example via the cap nut, the pressure screw or the pressure part, or its pressure contour as it slides with increasing screwing depth onto or into the other part. One of the parts abuts the delimiting contour, which serves as an axial path limitation, in a way that it is retained in the axial direction upon sliding on the other part, thus allowing a displacement of the parts towards one another. Upon achieving the first assembly position, the second part overlaps the first part, for example, with its complete length. For example, both parts can abut the delimiting contour with their first end regions.

One of the parts has a radially circumferential thickening, such that the displacement of the parts towards one another causes a radial deformation of the second end region of one of the parts. The second end region can be deformed radially inwards and/or radially outwards. In a second step, the device is put into the nominal assembly (assembled) position. For this purpose, the pressure screw, the cap nut or the pressure part is gradually screwed into our onto the opening of the cylindrical reception, wherein with increasing screwing depth, the pressure screw, the cap nut, the pressure part or its pressure contour exerts an increasing radial pressure onto the sealing- and/or clamping element, in a way that the first radial deformation caused in the first step is additionally increased and an improved sealing and/or clamping is realized at least through the second end regions of the sealing- and/or clamping element.

In such aspects of the present disclosure, the thickening arranged in the second end region of the second part causes, for example, a radially decreasing of the geometry of the through hole. The second end region of the first part is, through the thickening when the second part is at least partly or completely slid onto the first part, deformed radially inwards, and that in the pressure screw, the cap nut or the pressure part a pressure contour is formed a narrowing of its clearance width and by doing such at least the second end region of the second part together with the first part in a nominal assembly position is deformed radially inwards. This provides the advantage that the first step, in which the second part is slid onto the first part, causes a radial tapering of the through hole, in a way that the through hole is narrowed and an elongate part being passed therethrough can be retained in a clamping and/or sealing way with the device already in the first assembly position. In some aspects, in the first step the first part is deformed by a small amount of force and the device is put into a first assembly position. Both parts can abut the delimiting contour in a way that the second part is also retained non-displaceably in the axial direction. By means of the applied pressure which is increased in the second step through the pressure contour narrowing the clearance width of the cap nut, the pressure screw or the pressure part, a further radial deformation radially inwards is realized. This deformation can also have an effect on the first part, in a way that its radial deformation caused in the first step is additionally increased.

The more the pressure screw, the cap nut or the pressure part is screwed in or on the cylindrical reception, the larger is the deformation radially inwards and the smaller becomes the through hole, such that with a smaller screwing-in or screwing-on depth, large diameters can be retained, and with a greater screwing-in or screwing-on depth, decreasing diameters can be retained. Due to the interaction of the two tube-like parts in combination with the pressure contour narrowing the clearance width of the pressure screw, the cap nut or the pressure part, it is possible to clamp and to seal numerous elongate or similar parts having different diameters, without using an additional sealing insert or device with a larger or smaller diameter.

Alternatively, or in addition to, it can be provided that the thickening is arranged in the second end region of the first part, and wherein the second end region of the second part is, through the thickening when the second part is at least partly or completely slid onto the first part, is deformed radially outwards, and that the pressure screw, the cap nut or the pressure part with a pressure contour is formed with a narrowing their or its clearance width, by means of which at least the second part together with the first part is in a nominal assembly position deformed radially outwards.

In the first step, for example via a pressure part or its pressure contour, a pressure is exerted on the first part, in a way that the parts are slid onto one another with increasing pressure. The second part can abut the delimiting contour, which serves as axial path limitation of the one part, in a way that, when the parts are slid onto one another, it is retained in the axial direction which allows a displacement of the parts relative to one another. When the first assembly position is achieved, the second part overlaps the first part, for example, with its complete length both parts and may abut with the first end region to the delimiting contour and are thus retained non-displaceably in the axial direction. The first part has a thickening being arranged radially outwards, which during the displacement of the parts generates a deformation of the second part radially outwards, in a way that the second part is pressed against the mantle inner surface of the cylindrical reception thus providing a sealing in this region.

In a second step, the device is put into the nominal assembly position. For this purpose, the pressure part is increasingly applied or screwed into or onto the opening of the cylindrical reception, wherein with increasing screwing-in or -on depth, its pressure contour exerts an increasing radial pressure onto the first part and thus an increasing deformation. This deformation also effects onto the second part, in a way that its first radial deformation generated in the first step is additionally increased. This provides a safe sealing towards the cylindrical reception. It can have various diameters, wherein in case of larger diameters, the pressure part is more and more screwed on or screwed in, pressed, pushed or the like.

In some aspects of the present disclosure, it is provided that the first part or the second part has an essentially constant thickness over its length. This provides that one part can easily and without obstacles be axially displaced on the other part. It is provided that the opening region is the delimiting contour of the cylindrical reception. This provides a particularly cost-effective and simple solution. In such aspects, the delimiting contour may be a step or an edge or a similar contour tapering the cylindrical reception, wherein the delimiting contour may be arranged radially circumferentially in the cylindrical reception. This provides a simple and cost-effective way of producing an axial limitation.

In some aspects of the present disclosure, the delimiting contour has a support contour at which or in which the first part and/or the second part with the first end region is supported or retained radially inwards and/or outwards. The support contour secures the parts against an undesirable sliding-off into or over the cylindrical reception. A radial internal support is advantageous in order to have only the second end region of the first part radially deformed. In some aspects, the support contour is a support collar axially protruding from the delimiting contour.

A cylindrical reception having a support collar can be manufactured in a simple and cost-effective manner. For the same reason, in some aspects it may be provided that the support contour is an axial groove being open at its end face. In such aspects the support collar or the side walls of the groove may be aligned with the mantle outer surface and/or the mantle inner surface of the cylindrical reception. This provides a plane mantle inner surface in the channel, which facilitates the passing-in of an elongate part.

In some aspects of the present disclosure, the first end region of the first part being supported at or in the support contour, is in relation to the second end region set back corresponding to the material strength of the support collar or the radial internal side wall of the groove, in a way that the mantle inner surface of the first part in an initial position in the second end region is aligned with the inner surface of the support collar or the groove mantle. Thus, in the initial position, a stepless mantle inner surface for introducing an elongate part is provided. Also, the first and/or the second part may be retained of or in the support contour over less than two thirds of its length, for example over one third of its length. In this way, the corresponding part is safely retained in the region of the support contour even if the second end region is deformed, and sufficient material overlaps the support contour, such that a radial deformation of the second end region and a sealing by it can be performed. In some aspects, the two parts have approximately the same length.

In some aspects of the present disclosure, the part with the pressure screw or the cap nut, having or forming the support contour, forms a gap with a threaded connection of the pressure screw or the cap nut. The gap forms a guiding aid for each of the axially displaceable parts. In the nominal assembly position, both parts can be arranged in the gap, and being radially inwards supported by the support contour while radially outwards supported by the cap nut or the pressure screw. For the same reason it can alternatively be provided that the part having or forming the support contour forms a gap together with the mantle inner surface of the cylindrical reception. In such aspects, both parts may abut the delimiting contour in a first assembly position. This has the advantage that both parts are fixed in the axial direction and when the pressure is increased in the second step, more radial deformation is performed.

In some aspects of the present disclosure, the first end regions have a common maximum thickness which corresponds to the size of the gap. In this way, both parts are guided and retained inside and/or outside. An undesired rotation or buckling of the parts can be additionally inhibited in a corresponding manner. It is also provided that between the pressure screw or the cap nut, for example between a threaded connection of the pressure screw or the cap nut, and the second part, a second gap is formed in a first assembly position. This bears the advantage that the cap nut or the pressure screw can be screwed on or in without much of a resistance due to friction between the threaded connection and the second part.

In some aspects of the present disclosure, the decreasing thickening is arranged in the second end region of the first part and/or in the second end region of the second part and that the facing first end region is thin-walled. This form is especially suitable in order to plug the second part having a thin-walled area, onto the first part, in a way that it is retained on it. An increasing amount of force is applied when the pressure screw, the cap nut or the pressure part is screwed on or in or inserted, as soon as the thickening deforms the second end region. In some aspects, the decreasing thickening in the first assembly position and in the nominal assembly position forms a tapering of the through hole. A tapering in the first assembly position has the advantage that an elongate part can be fixed in the device already with little clamping force.

In some aspects of the present disclosure, the parts have facing sliding surfaces with a low friction coefficient, at least in the area overlapping one another. In such aspects, the parts slide over these sliding surfaces and are deformed into the desired position, without having to overcome high friction forces. For the same reason the second part can have sliding surfaces at least facing the pressure contour, with or without the sliding surface having a low friction coefficient. In some aspects, the sliding surfaces are conical, spherical, concave or convex surfaces. This form provides that the degree of deformation of the parts increases with increasing screwing-in or -on of the pressure screw, cap nut or of the pressure part, while the force to be applied increases continuously and slowly during tightening. For the same reason, the pressure contour can be shaped by an inner wall tapering conically, spherically, concavely or convexly in the direction of the opening.

In some aspects of the present disclosure, the pressure screw, the cap nut or the pressure part, have a circumferential protrusion which supports one or more tube-like parts in the axial direction. Upon tightening the pressure screw, the cap nut or the pressure part to achieve the first assembly position, one of the parts is with the second end region supported at the protrusion, in a way that the part is displaced at first in the axial direction, for example, until the second part is with its complete length slid onto the first part and/or both parts touch the delimiting contour with the first end region. Then, the part slides over the protrusion and the radial deformation starts which requires application of a higher force. In some aspects, one or more parts have circumferential axially and/or obliquely directed channels, grooves, slots or similar material tapering and/or material recesses. This facilitates the radial deformation which can be advantageous especially in case of high wall thickness.

In some aspects of the present disclosure, the stud has an assembly end region for being attached to the wall, in particular an external thread, passing through the wall. In order to attach the stud to the wall, it comprises for example a thread. An engaging contour for a tool is provided at the stud, for screwing the stud into a screw thread or for retaining it while a locknut is being screwed onto the thread region. In such aspects, the second part can lie or be positioned behind the external thread, which means that it does not radially overlap it. This provides the advantage that a cap nut can be screwed onto the stud while the internal thread of the nut is not engaged with the second part, and thus it cannot be damaged or co-rotate.

The cylindrical reception may be made of a metal or a dimensionally stable plastic or of a similar dimensionally stable material, while the pressure screw, the cap nut or the pressure part may be made of a metal or a dimensionally stable plastic or of a similar dimensionally stable material. Such devices can be produced cost-effectively and offer sufficient stability and durability.

In some aspects, the pressure part is a flange, which can be attached by a fastener(s) in front of a section or in a section of a wall, and which has a through hole being coaxial towards the passage opening. This is for example suitable in cases where the sealing and/or clamping element is arranged inside a wall. For this purpose, the flange has for example through holes, through which a corresponding fastener(s) can be passed and with which the flange can be attached to the wall. Such a fastener(s) may for example be screws or bolts. By means of tightening the fasteners, the flange is pressed to the wall and exerts pressure onto the sealing and/or clamping element arranged inside.

In some aspects of the present disclosure, the first part and the second part are made of a plastic material, wherein the first part and/or the second part can have a coating which improves the sliding ability or are made of materials enhancing the sliding ability, and wherein the second part can be more dimensionally stable as compared to the first part. For example, the second part can be made from a dimensionally stable plastic, whereas the first part is made of an elastomer, rubber-elastic plastic. Plastic materials are especially suitable for such parts as they are easily deformable, very durable and can be produced cost-effectively. The coating can for example be a polymer coating. Such coatings provide an even movement of the parts towards one another, without adhering to each other. For example, PTFE is a suitable coating. It is also possible that one of the parts or both parts are made of PTFE.

Especially advantageous is to render the second part more dimensionally stable compared to the first part, in a way that it can be displaced axially, possibly until the delimiting contour is reached, through the pressure applied, without already being deformed in the redial direction. For example, the first part can be made of an elastomer, rubber-elastic plastic as for example elastomers, in order to provide a slight deformation. Moreover, the rubber-elastic plastic adapts to the second part and the elongate part, in a way that a high degree of sealing and/or clamping is realized. Also, the second part is more dimensionally stable compared to the first part, for example being made of a dimensionally stable plastic, whereas the first part is made of an elastomer, rubber-elastic plastic.

In some aspects of the present disclosure, the first part is made of various materials, wherein the material of the first end region has a higher stability or dimensional stability than the material of the second end region. Also, the first part and/or the second part can be made of materials such that co-rotation or buckling of at least one of the tube-like parts is inihited.

In some aspects of the present disclosure, one or more further tube-like parts, in particular of similar forms, is or are plugged onto the second part or onto another part in an axially displaceable manner, wherein it is provided that the thickening of each further similarly shaped plugged-on part has a greater thickness than the respective previous part, and that the length of each further tube-like part between the thickening and the free end not facing the thickening is shorter than the length of the previous part. Through this kind of arranging of tube-like parts, the device can be applied in an even more variable way, because an even greater clamping area can be realized, which can retain various elongate parts. By means of arranging the parts in cascade, a higher clamping force and/or a higher sealing is given, and thus a greater clamping distance is realized.

In some aspects of the present disclosure, the contact area between the first end region of the first part and the delimiting contour is provided such that an increase in the disassembly force is provided. For example, via geometrical design, hook-like engaging retaining contours are provided. This provides the advantage that upon loosening the pressure contour, the first part is retained on or in the cylindrical reception in a captive manner, while the pressure contour and the second part can be disassembled. In such aspects, a force can be introduced in the area of the second part which is encompassed by the pressure screw, the cap nut or the pressure part, for removing and disassembling the second part from the nominal assembly position, in order to facilitate the disassembly of the first part being connected to the stud, especially to the delimiting contour. For example, at the second part and at the pressure screw, the cap nut or the pressure part, engagement with one another in the assembled state is provided, which during disassembly generates the introduction of force between pressure screw, cap nut or pressure part and second part for removing the second part towards the first part. In this way, upon disassembling the pressure screw, the cap nut or the pressure part, the second part is retained in it and can be removed from the first part. In some aspects, in an inner shell or encompassing area of the pressure screw, the cap nut or the pressure part, covering the second part in the assembled state, a free space is shaped which does not limit the axial movability of the second part, in particular during assembly. However, the free space assists in performing disassembly of the device. For example, during assembly the force is introduced in the free space forming a radially circumferential recess, wherein the recess corresponds to the length of the clamping path, in a way that an axial movement of the pressure screw, the cap nut or the pressure part in the axial direction during the screwing in or on or off is not hindered. During disassembly, for example an edge delimiting the free space can allow for removing the second part.

In some aspects of the present disclosure, within the cylindrical reception, for example within the stud, contacting or clamping an electrically conductive or protective part of a cable being placed on or in the outer area of the cable is provided. For example, a cable shield, a concentric external conductor or a protection mesh can be contacted or clamped in the outer area of a cable. In some aspects of the present disclosure, a spring contacts a cable shield, for example a closed annular spring having a triangular cross-section. In some aspects, radially or axially effective surfaces clamp a conductive or protective part of the cable and also act on the electrically conductive or protective part of the cable via a force, for example a mechanical force, by screwing at least one other part with the stud, and/or a spring force.

At least one exemplary aspect of the device according to the teachings of the present disclosure is shown in the drawing and described in more detail in the following.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
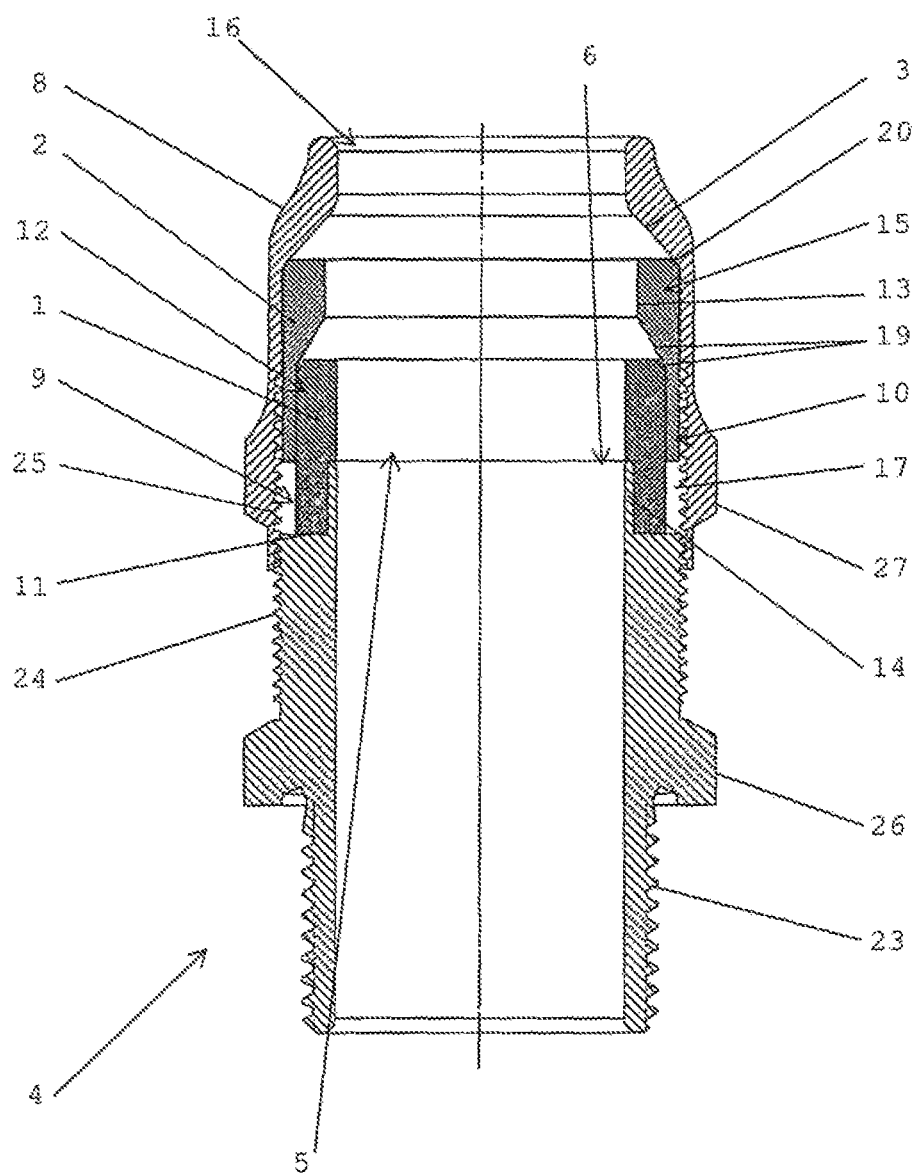
FIG. 1 is a longitudinal section of a device in the initial position.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 shows the device in its initial position. The device comprises a cylindrical reception in the form of a stud 4, into which a sealing and/or clamping element having a through hole 5 is inserted, as well as a cap nut 8 screwed partially onto an external thread 24 of the stud 4 within the opening region 6. In this position, the sealing and/or clamping element is not deformed. The sealing and/or clamping element consists of a first and a second tube-like part 1, 2, wherein the first part 1 which has an essentially constant thickness of few millimeters, is connected, for example abuts, with its first end region 9 at its end face to a delimiting contour 11 of the stud 4. In some aspects of the present disclosure, the sealing and/or clamping element comprises the first and the second tube-like part 1, 2.

The stud 4 has at its end face the delimiting contour 11 comprising a support contour 14 in the form of an axially protruding support collar, onto which the first part 1 is with its first end region 9, with approximately one third of its length, plugged on, and at which the first end region 9 is supported inside radially circumferentially. This first end region 9 of the first part 1 is set back towards the second end region 12, inside and corresponding to the material strength of the support contour 14, in a way that the inner shell of the first part 1 within the second end region 12 is aligned with the support contour 14. Thus, the channel formed by a through hole 5 and the cylindrical reception, has a stepless mantle inner surface, through which an elongate part can be passed through in a simple manner.

The support contour 14 forms a gap 17 with the inner shell of the cap nut 8, in which the first end region 9 of the first part 1 is arranged and which with the cap nut 8 screwed on receives at least also a part of the thin-walled first end region 10 of the second part 2. The second end region 12 of the first part 1 protrudes beyond the stud 4 respectively beyond the support contour 14 and can be deformed radially inwards in the nominal assembly position.

The second part 2 comprises a thin-walled first end region 10 over approximately half of its length and an approximately three times thicker thick-walled second end region 15 over approximately half of its length, wherein the thick-walled region is the thickening 13. With its thin-walled first end region 10, the second part 2 is plugged onto the second end region 12 of the first part 1. The thickening 13 overlaps the first part 1 in the initial position.

Figure 2:
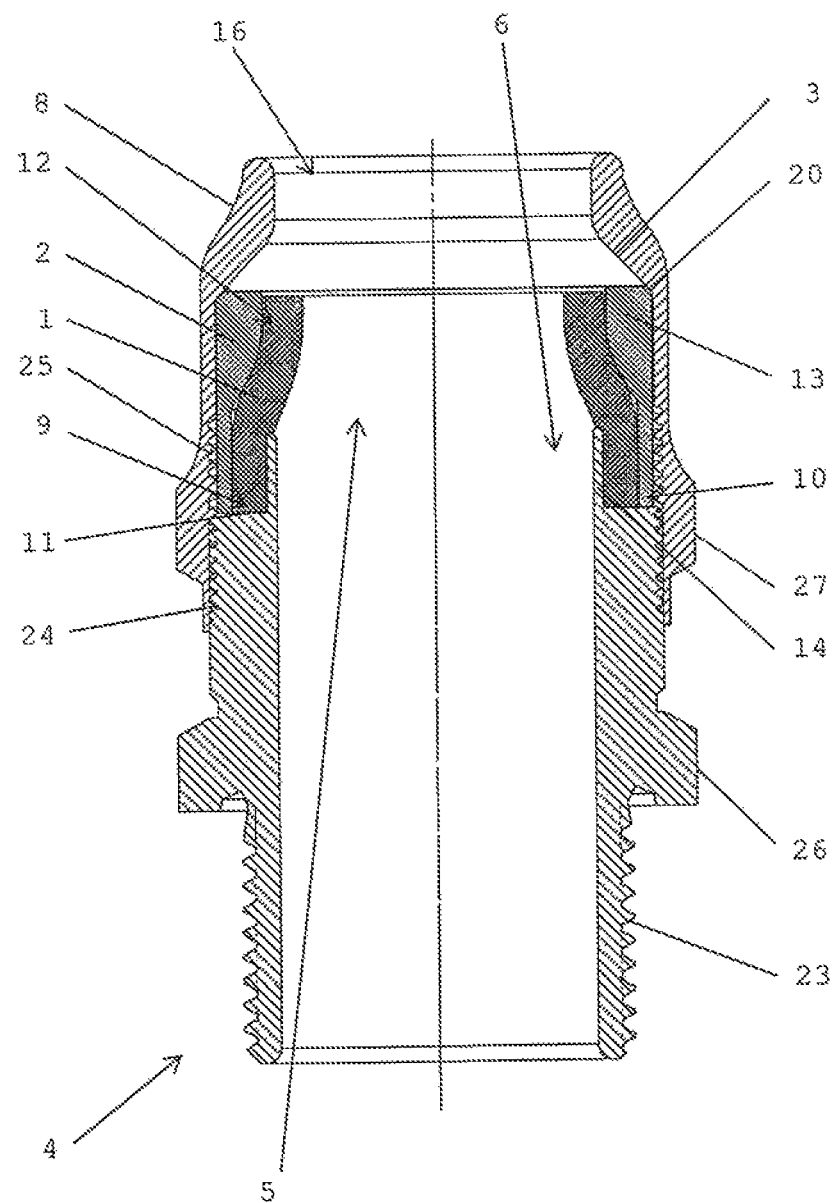
FIG. 2 is a longitudinal section of the device in a first assembly position.

The cap nut 8 is partly, the two parts 1, 2 in an overlapping manner, screwed onto the stud 4, wherein their internal thread 25 is engaging with the external thread 24 of the stud 4. An elongate part not shown in the figures, is introduced through the stud 4 and the device is put into the first assembly position in a first step, which is shown in FIG. 2.

For this purpose, the cap nut 8 is for example tightened manually and the sealing and/or clamping element, in particular its first part 1 in the second end region 11 is partly deformed radially inwards. Upon reaching the first assembly position, the internal thread 25 is partly, namely approximately half of it, screwed onto the external thread 24.

The pressure contour 3 of the cap nut 8 narrowing the clear width, exerts an axial pressure on the second part 2 upon tightening the cap nut 8, and pushes it with its thin-walled first end region 10 into the gap 17 between cap nut 8 and support contour 14 respectively first end region 9. The second part 2 is with increasing screwing depth of the cap nut 8 slid axially further onto the first part 1 and in the first assembly position completely overlaps the first part 1.

With the end face of its end region 10 facing the stud 4, the second part 2 then also touches the stud 4, respectively the delimiting contour 11 and is placed together with the first end region 9 in the gap 17 between the cap nut 8 and the support contour 14. The first end region 10 and the first end region 9 together have a thickness corresponding approximately to the gap 17, wherein the second part 2 radially lies slightly back behind the external thread 24. As the second part 2 abuts with its end face and abuts to the pressure contour 3, the second part 2 is fixed in the axial direction.

Figure 7:
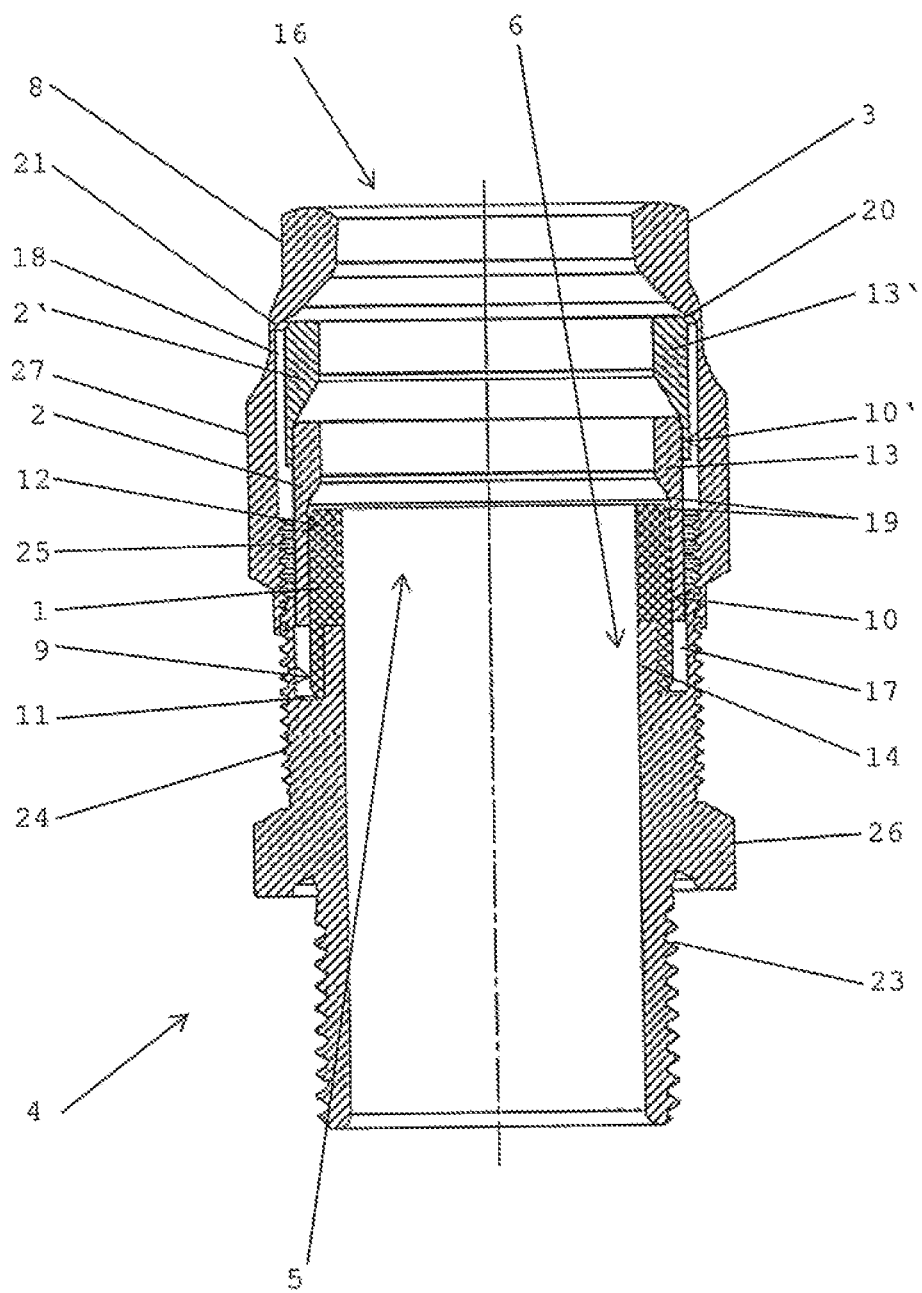
FIG. 7 is a longitudinal section of an form of the device in the initial position.

In order to provide that the second part 2 is maximally displaced in the first step, until reaching the stud 4, a circumferential protrusion 21 can be arranged between the internal thread 25 and the pressure contour 3, which acts with its end face upon the second end region 15 of the second part 2. Such a protrusion 21 is shown in FIG. 7.

The second end region 12 of the first part 1 protruding beyond the stud 4 is increasingly deformed radially inwards through the thickening 13 of the second part 2. Consequently, the through hole 5 is in the first assembly position a bit narrowed, in a way that an elongate part being positioned in it, is retained in a preassembled, clamping and sealing manner.

Figure 3:
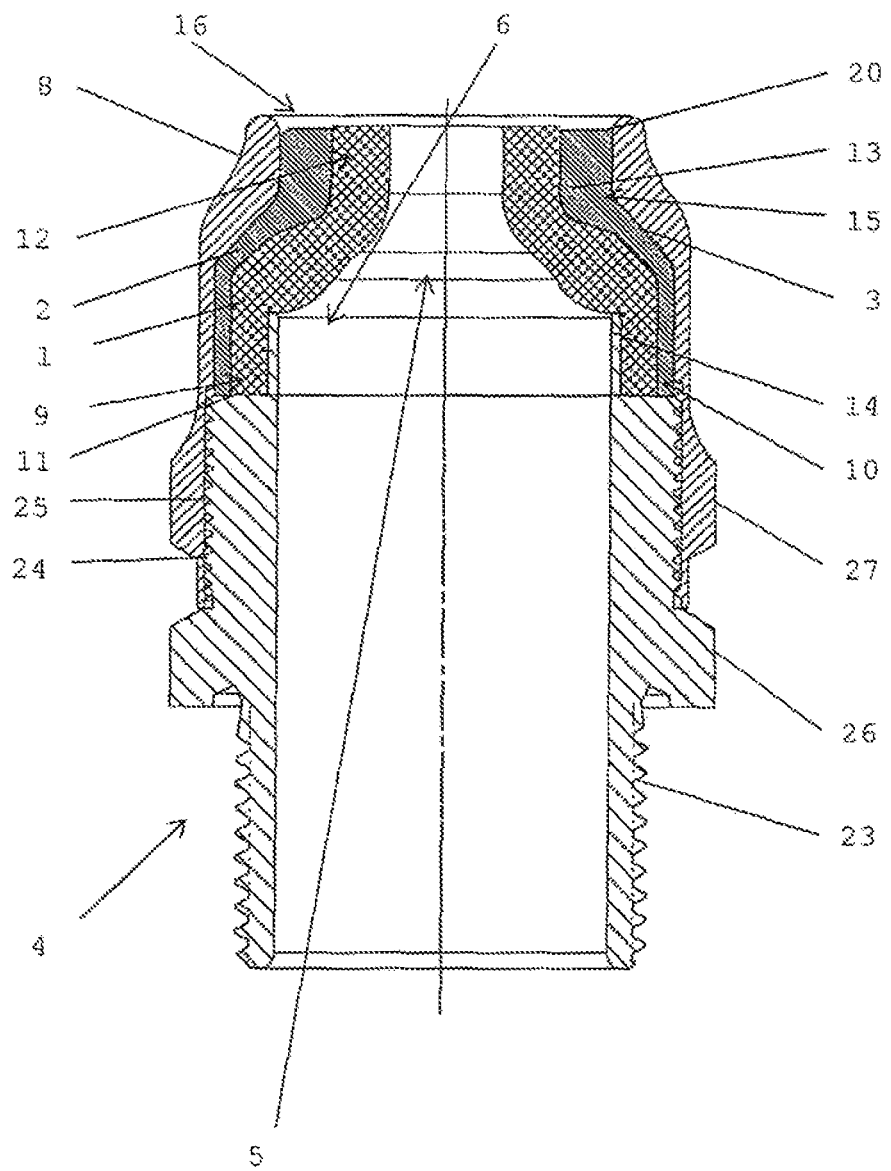
FIG. 3 is a longitudinal section of the device in a nominal assembly position.

In a second step, the cap nut 8 is put into the nominal assembly position, for example by using a tool, as shown in FIG. 3. For this purpose, the cap nut 8 provides an engaging contour 27 for a corresponding tool as for example a wrench.

The second part 2 lies radially outside back behind the first external thread 24, which provides the advantage that the cap nut 8 can be screwed onto the stud 4, without the internal thread 25 of the cap nut 8 being engaged with the second part 2 which might thus be damaged or co-rotate. In addition, a gap 18 can be provided between the cap nut 8 and the second part 2.

The pressure contour 3 of the cap nut 8 essentially exerts an axial pressure onto the second part 2 upon tightening, wherein the second part 2 abuts with its end face the stud 4 and is thus axially fixed. To relief the pressure, a deformation radially inwards is performed. The pressure contour 3 is formed by an inner wall tapering conically, spherically, convexly or concavely in the direction of the passage opening 6, wherein the second part 2 has sliding surfaces 20 with a low friction coefficient facing the pressure contour 3, in a way that the degree of deformation of the second part 2 increases with increasing screwing depth of the cap nut 8 and correspondingly the force to be applied. Between the parts 1, 2 correspondingly formed oblique sliding surfaces 19 are also arranged, in a way that they can slide over one another upon deformation.

Figure 4:
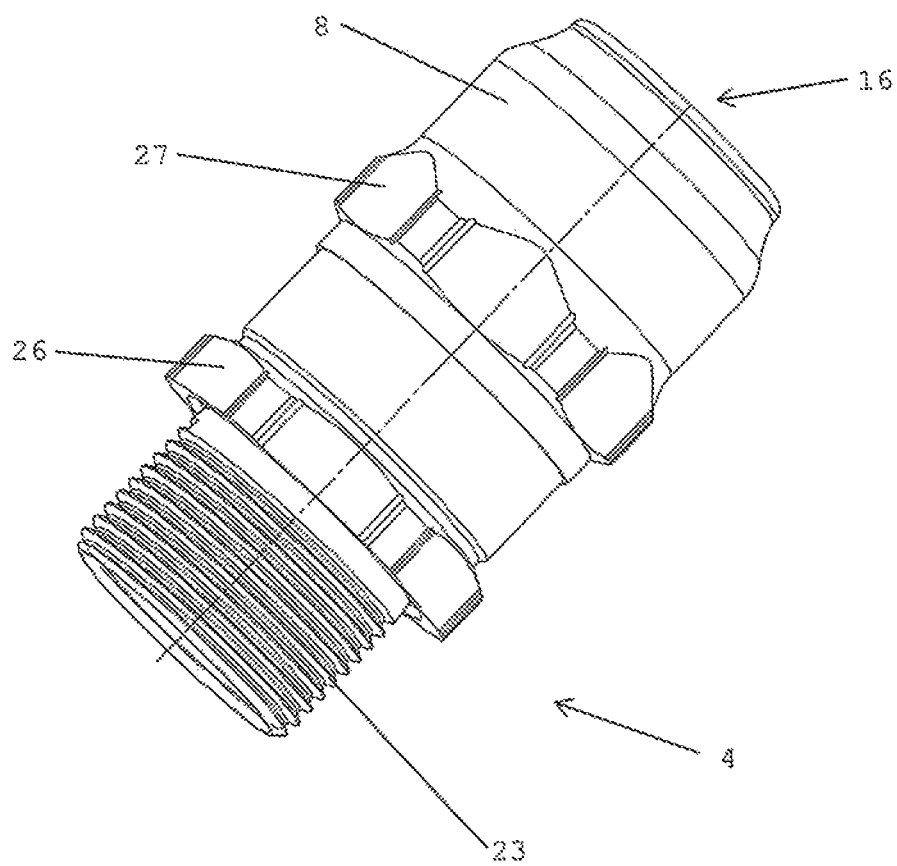
FIG. 4 is a view of the device in the assembled state.

The deformation of the second part 2 also acts upon the second end region 12 of the first part 1, which is with its first end region 9 retained behind the support contour 14. This strengthens the radial deformation of the first part 1 performed in the first step, while sealing, clamping and retaining the elongate part being positioned in the through hole 5, wherein various diameters of the elongate part are clamped and sealed. FIG. 4 shows the device in the assembled state. The cap nut 8 is screwed onto the stud 4, wherein the stud 4, for being attached in an assembly wall, as well as the cap nut 8, for tightening the cap nut 8 onto the stud 4, have an engaging contour 26, 27 for a wrench. An external thread 23 is provided at one end of the stud 4, with this external thread 23 the stud 4 can be passed through the assembly wall. For fixing, a lock nut can be screwed on, if appropriate inserting a seal ring.

Figure 5:
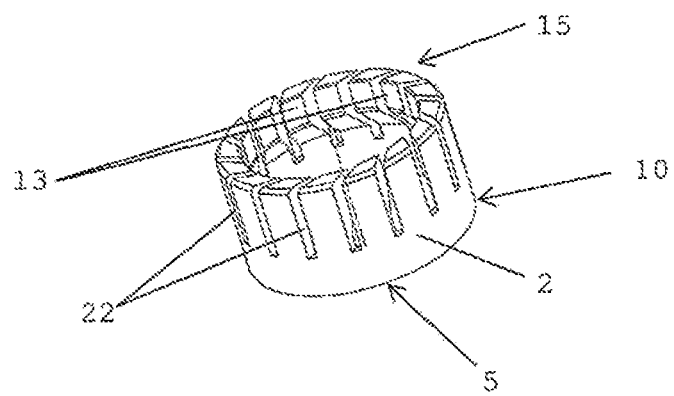
FIG. 5 is a view of one form of a detail of the device.
Figure 6:
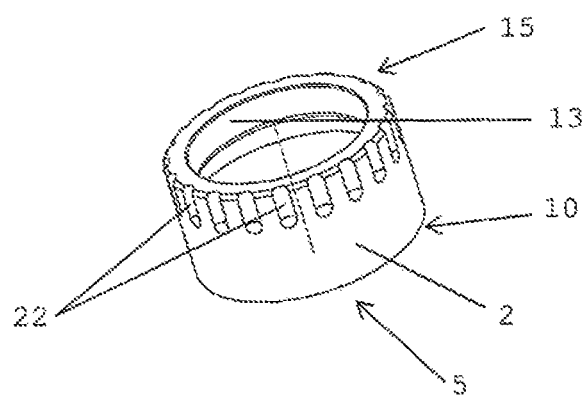
FIG. 6 is a view of a further form of a detail of the device.

Each of FIGS. 5 and 6 show the second part 2, wherein this can have axial and/or obliquely directed channels, grooves, slots 22 or similar material tapering and/or material recesses, which is especially advantageous, if massive elements with corresponding wall thickness are concerned. These can hardly be deformed otherwise.

The stud 4 and the cap nut 8 are made of metal or of a dimensionally stable plastic or of similar dimensionally stable materials. Such materials are durably functional and can be produced correspondingly cost-effectively.

The first part 1 is can be made of an elastomer, rubber-elastic plastic, in order to provide a slight deformation. The rubber-elastic plastic adapts to the delimiting contour 11, the support contour 14 and to the elongate part not shown in the figures, in a way that a high sealing is realized.

The second part 2 compared to the first part 1 has a higher shape stability and is for example made of an elastomer, in order to be axially displaced, for example until the stud 4 is reached, through the pressure applied by the cap nut 8, without being already deformed in the radial direction. One or both parts 1, 2 can be provided with a friction-reducing coating as for example a polymer coating. This allows the axial movement of the two parts 1, 2 towards one another without adhering to each other. For example, PTFE is suitable as coating. It is also possible that one of the parts or both parts 1, 2 are made of PTFE.

FIG. 7 shows one form where a further tube-like part 2' having a similar shape as the second part 2, is plugged axially displaceable onto the second part 2. Even further tube-like parts 2 can be plugged on. The thickening 13' of the other part 2' has a greater thickness compared to the second part 2.

Figure 8:
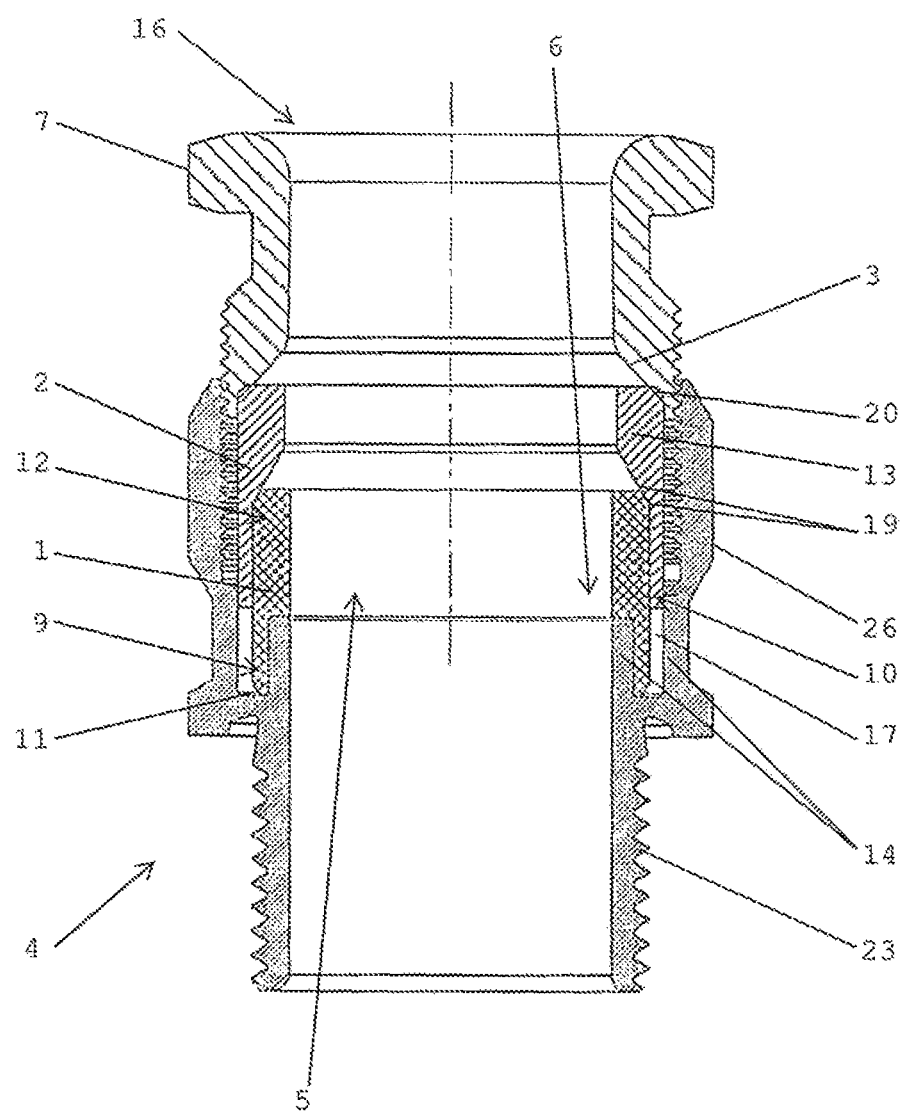
FIG. 8 is a longitudinal section of a form of the device in the initial position.

Due to this form, the device can be applied in an even more variable manner, as an even larger clamping region is provided. It is possible to guide elongate parts having different diameters, in a sealed and clamped way through a wall opening by using a device. Furthermore, the arrangement of the parts 2, 2' in a cascade-like manner allows a higher clamping force and an even stronger sealing. FIG. 8 shows a device having a pressure screw 7 instead of a cap nut 8 with a hole, in the initial position.

Figure 9:
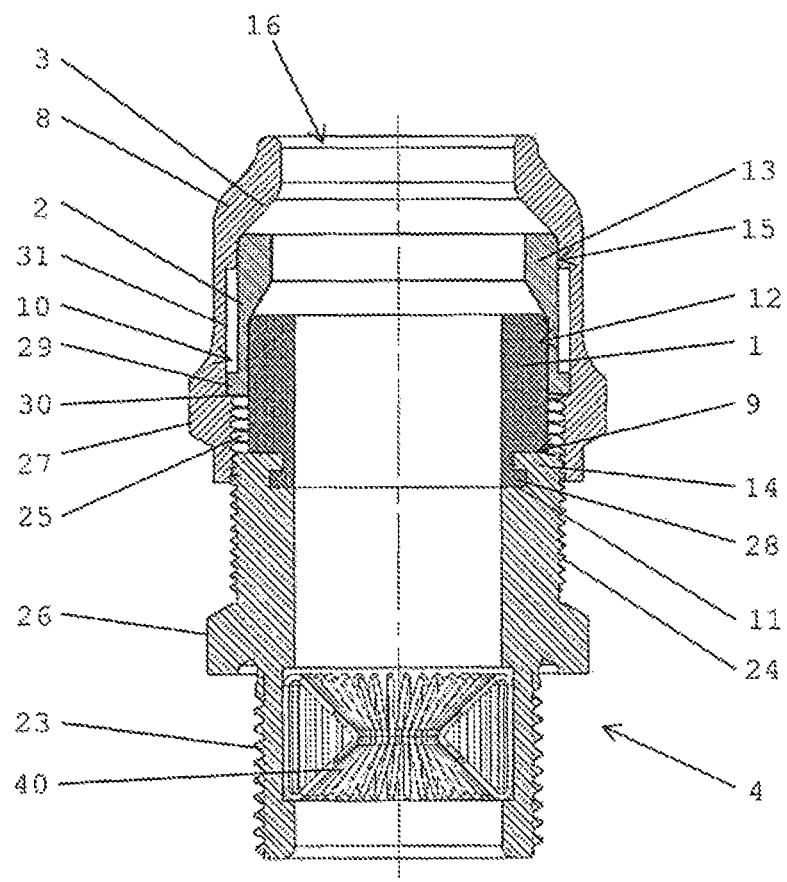
FIG. 9 is a longitudinal section of a form of the device.

FIG. 9 shows a portion of a device having a disassembling aid. In the contact area between the first part 1 and the delimiting contour 11, a hook-like retaining contour 28 is arranged. This hook-like retaining contour 28 engages during assembly, in a way that the first part 1 is retained at or in the cylindrical reception. The hook-like retaining contour is shaped by an outer circumferential groove at the first part 1 and by an inner circumferential groove at the stud 4, wherein hooks are formed by the grooves, engaging into one another in the nominal assembly position.

Figure 10:
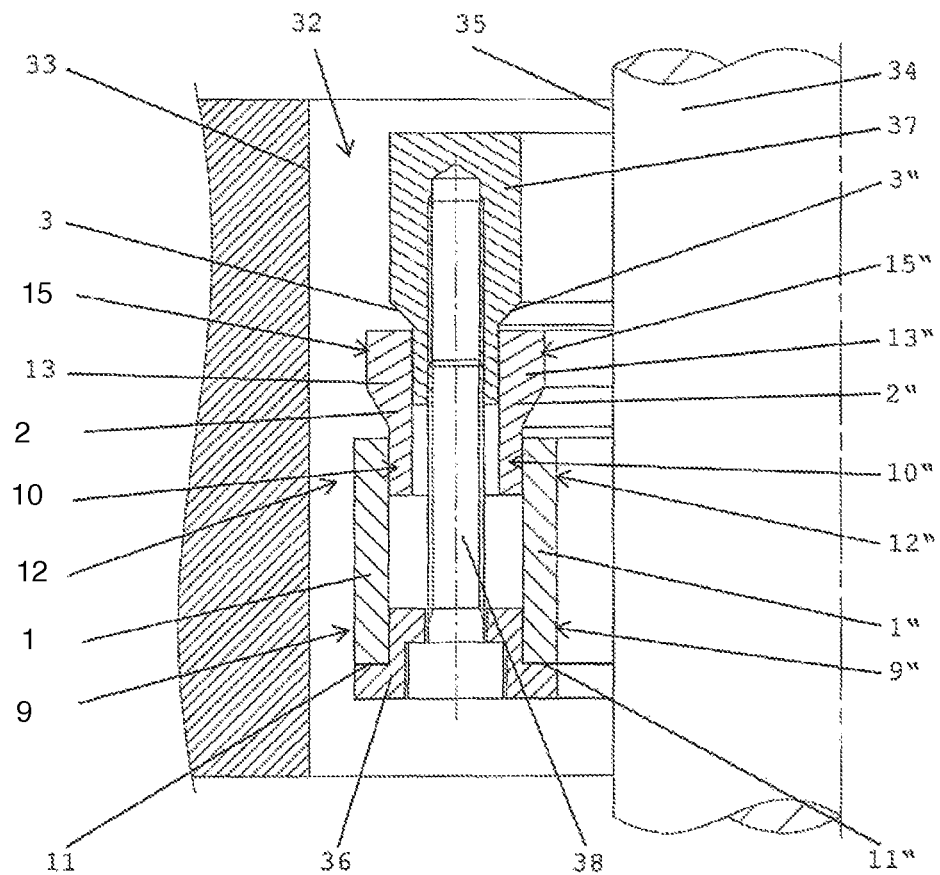
FIG. 10 is a longitudinal section of a portion of a device in an annular gap.

In the region of the second part 2, which is encompassed by the cap nut 8, an engager 29 is formed by engaging with a delimiter 30 of the cap nut 8. These engager 29 and delimiter 30 provide for an introduction of force between cap nut 8 and second part 2 during disassembly, in order to remove the second part 2 towards the first part 1. During the removal of the second part 2, the first part 1 is retained in or at the cylindrical reception by the hook-like retaining contour 28. This considerably facilitates disassembly. At the inner surface of the cap nut 8, a radially circumferential free space 31 is shaped, and its axial length corresponds to the axial displacement path of the second part 2, unrestrictedly allowing the axial movability of the second part 2 during the tightening of the cap nut 8. The delimiter 30 can be an edge delimiting the free space 31, which is in the shown position engaging with the engager 29 of the second part 2, namely a radially protruding collar. During disassembling the cap nut 8, the second part 2 is retained in the cap nut by the engager 29 and delimiter 30, and it can be removed from the first part 1 in a simple manner. An EMV-contacting element in the form of a closed annular spring 40 having a triangular cross section is additionally inserted into the stud 4. FIG. 10 shows a device in an annular gap 32 in the initial position. The annular gap 32 is positioned between a mantle inner surface 33 of a recess, in particular a bore, and an elongate part 34, for example a cable. An annular sealing and/or clamping element consisting of a first part 1 and a second part 2, is arranged in a distance to the outer surface 35 of the elongate part 34. A further annular sealing and/or clamping element consisting of a first part 1" and a second part 2" is arranged in a distance to the mantle inner surface 33 of the bore. Into each of the first part 1 and the first part 1", an annular second part 2 respectively second part 2" is inserted, wherein the first end regions 10, 10" are inserted into the second end regions 12, 12". The first end regions 9, 9" abut at a delimiting contour 11, 11" of an abutment 36. The pressure part 37 can for example be a ring having the pressure contours 3, 3", which acts upon the second parts 2, 2" with an axial pressure in order to displace and deform them. For this purpose, a number of screws 38 can be arranged in an even manner distributed on the circumference, which are screwed into the pressure part 37 from below, passing through the abutment 36, wherein upon tightening the screws 38, the pressure part 37 is pulled in the direction of the abutment 36, thus performing in a first step an axial displacement of the second part 2 respectively of the second part 2" relatively to the first part 1 respectively to the first part 1". Upon displacing the parts 1, 2 respectively 1", 2" towards one another, the second end region 12 of the first part 1 is through the thickening 13 pressed radially outwards, respectively, the second end region 12" of the first part 1" is through the thickening 13" pressed radially inwards at the mantle inner surface 33 respectively the outer surface 35.

In a second step, the screw 38 is tightened until the nominal assembly position is reached. In this event, the pressure part 37 is pulled closer to the abutment 36 and the pressure contour 3, 3" generates a radial deformation even of the second end region 15 of the second part 2 respectively of the second end region 15" of the second part 2", in a way that the radial deformation of the first part 1 respectively of the first part 1", performed in the first step, is increased and each time, both first parts 1, 1" are deformed radially outwards respectively radially inwards. In the nominal assembly position, the first part 1 and the first part 1" abut at the mantle inner surface 33 and at the outer surface 35, in a way that the elongate part 34 is retained in a clamping manner in the bore, and a sealing of the annular gap is performed.

Figure 11:
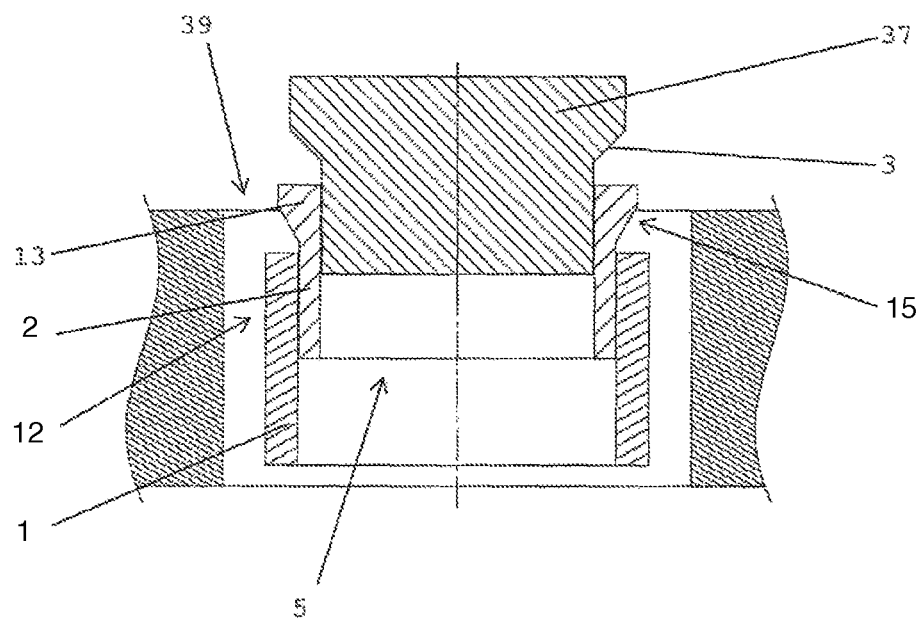
FIG. 11 is a device in a wall opening.

FIG. 11 shows a device in an opening 39, for example a bore, which provides a second part 2, a first part 1 plugged onto the second part 2 and a pressure part 37 inserted into the through hole 5 of the parts 1, 2, for closing the opening 39. In the opening 39, a delimiting contour 11 of any type can be provided to be used for the assembly or fixedly arranged, which is not shown in the drawing. The sealing is performed in two steps, for this purpose, the pressure part 37 is for example driven into the opening 39, wherein in a first step, an axial displacement of the parts 1, 2 is generated and the second end region 12 of the first part 1 is pressed radially outwards through the thickening 13. In a second step, the pressure part 37 is driven fully into the opening 39 and the second end region 15 of the second part 2 is deformed radially outwards through the pressure contour 3. The deformation of the first part 1, being performed in the first step, is even increased through the deformation of the second part 2, and both parts 1, 2 are in the nominal assembly position firmly pressed to the inner surface of the opening 39, such that this is sealed.

The present disclosure is not limited to this exemplary form, but it offers a lot of variations within the scope of the disclosure.

All new single and combined features disclosed in the description and/or in the drawings are considered to be desired to the present disclosure.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A device for the sealed closing of an opening for one or more elongate parts to pass through, the device comprising:
    a sealing and/or clamping element consisting of at least two interacting first and second parts which are axially displaceable relative to one another;
    a delimiting contour having a support contour at which a first end region of the second part is radially supported to prevent radial deformation of the first end region of the second part; and
    a pressure contour acting axially onto the sealing and/or clamping element, the pressure contour disposed radially outward of the second parts,
    wherein a first axial displacement of the pressure contour and an axial displacement of the at least one second part relative to the at least one first part causes a first change in geometry only of the at least one first part transversely to the displacement direction,
    wherein the second part is retained in the support contour over approximately one third of a length of the second part, and
    wherein a further axial displacement of the pressure contour causes a further change in geometry of both of the at least two interacting first and second parts of the sealing and/or clamping element transversely to the displacement direction.

2. The device according to claim 1 further comprising:
    a cylindrical reception with an opening region for inserting at a wall or in a wall or at a stud being attachable to a wall or formed in one piece with it, into which the sealing and/or clamping element having a through hole is inserted; and
    a pressure screw, a cap nut or a pressure part with the pressure contour, which can be put into, put onto, or screwed into or onto the opening region of the cylindrical reception and which acts upon the sealing and/or clamping element.

3. The device according to claim 2, wherein the sealing and/or clamping element comprises at least two, tubular first and second parts, the first part or second part being connected with the respective first end region to the delimiting contour of the cylindrical reception as an axial path limitation when the second part is plugged onto the first part and engaging over the first part at least partly in an axially displaceable manner.

4. The device according to claim 2, wherein a circumferential protrusion is arranged in the pressure screw, the cap nut or the pressure part, which supports one or more tubular parts in an axial direction.

5. The device according to claim 3, wherein a second end region of the first part and/or of the second part is radially deformed through a thickening of the second part and/or the first part when the second part is at least partly or completely slid onto the first part.

6. The device according to claim 3, wherein the first part and the second part in a first assembly position abut at their end faces to the delimiting contour.

7. The device according to claim 5, wherein the pressure screw, the cap nut or the pressure part comprise the pressure contour that radially deforms the first tubular part and/or the second tubular part when the first part is axially displaceable relative to the second part into a nominal assembly position.

8. The device according to claim 5, wherein the thickening is a thickening arranged in the second end region of the second part that radially decreases the geometry of the through hole, wherein the second end region of the first part is, through the thickening when the second part is at least partly or completely slid onto the first part, deformed radially inwards, and that in the pressure screw, the cap nut or the pressure part with the pressure contour is formed by narrowing its clear width, by means of which at least the second end region of the second part is together with the first part in a nominal assembly position deformed radially inwards.

9. The device according to claim 8, wherein the decreasing thickening in a first assembly position and in the nominal assembly position forms a tapering of the through hole.

10. The device according to claim 1, wherein the first part or the second part has a constant thickness over its length.

11. The device according to claim 1, wherein the first part and the second part have a same length.

12. The device according to claim 1, wherein the first part and the second part have at least one area overlapping each other with sliding surfaces facing each other.

13. The device according to claim 1, wherein the second part has a sliding surface facing the pressure contour.

14. The device according to claim 1, wherein the pressure contour is formed by an inner wall tapering conically, spherically, or convexly in the direction of the opening.

15. The device according to claim 1, wherein at least one of the first part and the second part have circumferential axially and/or obliquely directed channels, grooves, slots or similar material tapering and/or material recesses.

16. The device according to claim 1, wherein the first part and the second part are made of a plastic.

17. The device according to claim 1 further comprising the support contour in the form of an axially protruding support collar, wherein the first part comprises the first end region supported inside radially circumferentially by the support contour and a second end region aligned inside radially circumferentially with the support collar to form a stepless mantle inner surface through which an elongate part can be passed through.

18. The device according to claim 1, wherein the second part is made of a dimensionally stable plastic.

19. The device according to claim 18, wherein the first part is made of an elastomeric, rubber-elastic plastic that conforms to the dimensionally stable plastic of the second part.

20. A device comprising:
- a sealing and/or clamping element consisting of a first part and a second part which are axially displaceable relative to one another, the second part disposed radially outward of the first part, the first and second parts defining a smooth contact interface therebetween;
- a delimiting contour having a support contour at which a first end region of the first part is radially supported to prevent radial deformation of the first end region of the first part; and
- a pressure contour acting axially onto the sealing and/or clamping element, the pressure contour disposed radially outward of the second part,
- wherein all of the entire outer radial surface of the second part is flat and smooth,
- wherein upon a first axial displacement of the pressure contour, the first part is configured to radially deform about the support contour and the first end region of the second part is configured to displace into the support contour without radial deformation, and
- wherein a second end region of the second part is configured to radially deform upon a further axial displacement of the pressure contour.

* * * * *